US009388850B2

(12) United States Patent
Ottolini et al.

(10) Patent No.: US 9,388,850 B2
(45) Date of Patent: Jul. 12, 2016

(54) ASSEMBLY OF TWO CONCENTRIC PARTS AND A BEARING BETWEEN SAID PARTS

(71) Applicant: Bluewater Energy Services B.V., Hoofddorp (NL)

(72) Inventors: Patrizio Giovanni Matia Ottolini, Voorhout (NL); Rudolf Ten Have, Uithoorn (NL)

(73) Assignee: BLUEWATER ENERGY SERVICES B.V., Hoofddorp (NL)

( * ) Notice: Subject to any disclaimer, the term of this patent is extended or adjusted under 35 U.S.C. 154(b) by 0 days.

(21) Appl. No.: 14/642,052

(22) Filed: Mar. 9, 2015

(65) Prior Publication Data
US 2015/0260219 A1   Sep. 17, 2015

(30) Foreign Application Priority Data

Mar. 11, 2014 (EP) .................................... 14158767

(51) Int. Cl.
F16C 19/38 (2006.01)
F16C 35/00 (2006.01)
F16C 35/07 (2006.01)
F16C 35/073 (2006.01)
F16C 35/077 (2006.01)
F16C 17/10 (2006.01)
F16C 19/18 (2006.01)
F16C 33/58 (2006.01)
B63B 21/50 (2006.01)

(52) U.S. Cl.
CPC ............. F16C 19/381 (2013.01); B63B 21/507 (2013.01); F16C 17/107 (2013.01); F16C 19/188 (2013.01); F16C 33/583 (2013.01); F16C 35/00 (2013.01); F16C 35/07 (2013.01); F16C 35/073 (2013.01); F16C 35/077 (2013.01); F16C 2300/14 (2013.01); F16C 2326/30 (2013.01)

(58) Field of Classification Search
CPC ...... F16C 19/18; F16C 19/188; F16C 35/077; F16C 19/381
See application file for complete search history.

(56) References Cited

U.S. PATENT DOCUMENTS 2,016,292 A * 10/1935 Rarey .................... F16C 19/188
                                                    89/36.13
3,651,525 A    3/1972 Rutten
(Continued)

FOREIGN PATENT DOCUMENTS

FR      2950315      3/2011
WO      9307049      4/1993
WO      9748595     12/1997

OTHER PUBLICATIONS

European Search Report for corresponding foreign application EP 14158767, filed Mar. 11, 2014.

Primary Examiner — Thomas R. Hannon
(74) Attorney, Agent, or Firm — Steven M. Koehler; Westman, Champlin & Koehler, P.A.

(57) ABSTRACT

An assembly of two concentric parts and a bearing between the parts is provided with an inner bearing ring, an outer bearing ring, axial rollers and radial rollers. A first bearing ring is attached to a first concentric part in a manner for maximally limiting a radial distortion thereof and a second concentric part is connected to the second bearing ring at an engagement location. The second concentric part has a load support member which is connected to the second bearing ring such that the vertical load introduced into the second bearing ring by the load support member extends through the axial rollers without causing a moment around the axial rollers, and wherein the second concentric part indirectly or directly engages the second bearing ring in such a manner that only radial loads and substantially no axial loads are introduced at the at least one engagement position.

20 Claims, 5 Drawing Sheets

(56) References Cited

U.S. PATENT DOCUMENTS

| | | |
|---|---|---|
| 5,359,957 A | 11/1994 | Askestad |
| 5,893,784 A | 4/1999 | Boatman |
| 2009/0175724 A1 | 7/2009 | Russ |
| 2010/0012010 A1* | 1/2010 | Gooijer .................. B63B 21/50 114/230.1 |
| 2011/0061582 A1* | 3/2011 | Braud .................. B63B 21/508 114/293 |

* cited by examiner

ASSEMBLY OF TWO CONCENTRIC PARTS AND A BEARING BETWEEN SAID PARTS

BACKGROUND

The discussion below is merely provided for general background information and is not intended to be used as an aid in determining the scope of the claimed subject matter.

Aspects of the invention relate to an assembly of two concentric parts and a bearing between said parts for allowing a relative rotation between said parts around a vertical axis of rotation, wherein said bearing comprises an inner bearing ring, an outer bearing ring, axial rollers for transmitting, between the inner and outer bearing rings, axial loads in parallel to the vertical axis of rotation and radial rollers for transmitting, between the inner and outer bearing rings, radial loads in a direction towards or away from the vertical axis of rotation, wherein a first one of said bearing rings is attached to a first one of said concentric parts in a manner for maximally limiting a radial distortion thereof and wherein the second one of said concentric parts is connected to the second one of said bearing rings at an engagement location.

It is noted that in the present context the indication "radial distortion" means to express a rotation or deformation of a transverse cross section of a bearing ring (wherein a transverse cross section of a bearing ring is a cross section which is positioned in a vertical plane extending through the vertical axis of rotation). Such a radial distortion especially may be disadvantageous in a bearing when it occurs in only one of the bearing rings or in a different amount in both bearing rings.

Under ideal circumstances the load situation should be such that axial loads between the bearing rings extend through the axial rollers without causing a moment around said axial rollers, and such that radial loads between the bearing rings extend through the radial rollers without causing a moment around said radial rollers. Thus, in such ideal circumstances hardly any radial distortion between the bearing rings would be caused. However, circumstances in state of the art assemblies of the type referred to above are not that ideal. Because the second concentric part is connected to the second bearing ring at the engagement location, both axial loads and radial loads will be transmitted into the second bearing ring at and through said engagement location. Generally, in the state of the art, the engagement location is defined at the interface between the second concentric part and the second bearing ring, and will be offset both in a radial direction (towards or away from the axis of rotation) and in an axial direction (in a direction parallel to the axis of rotation) with respect to the axial rollers and radial rollers, respectively (meaning that the resultant of the axial loads transmitted at the engagement location does not extend through the axial rollers, but more inwardly or outwardly, and that the resultant of the radial loads transmitted at the engagement location does not extend through the radial rollers, but at a higher or lower level. Thus the resulting axial and radial loads transmitted at the engagement location may cause moments (around the axial and radial rollers), leading to stresses and (radial) distortions (especially of the second bearing ring). Such radial loads may for example be caused by horizontal accelerations acting on the second concentric part (which may have a substantial weight). The distortions may result in a relative rotation between the two cooperating bearing rings which only in a limited amount can be taken up by bearing clearances and which thus will result in an uneven loading of the rollers which can result in failure and/or accelerated wear of the bearing.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Thus, in accordance with an aspect of the present invention, the second concentric part has a load support member which at the engagement location is connected to the second bearing ring such that the vertical load introduced into said second bearing ring by said load support member extends through the axial rollers without causing a moment around said axial rollers, wherein the second concentric part further comprises a load transfer member for transferring axial loads therein to said load support member and wherein the second concentric part indirectly or directly engages the second bearing ring at at least one engagement position in such a manner that only radial loads and substantially no axial loads are introduced at said at least one engagement position and wherein said at least one engagement position with respect to the engagement location is located such, as seen in the direction of the vertical axis of rotation, that the resultant of radial loads introduced into said second bearing ring at said at least one engagement position and at the engagement location extends through the radial rollers without causing a moment around said radial rollers.

In this manner it may be assured that the axial loads and radial loads do not radially distort the second bearing ring. Firstly, the load transfer member transfers axial loads (generally loads acting in an axial direction on the second concentric part, which among others may be external loads or mass loads, but also loads as a result of bending moments in the second concentric part) as much as possible to the load support member which is connected such to the second bearing ring that it is capable of transferring said loads into the second bearing ring in line with the axial rollers, thus without causing a moment. Secondly, the radial loads transmitted at the at least one engagement location and engagement position are balanced such that the resultant of these radial loads extends through the radial rollers, thus also without causing a moment.

The position of the engagement position(s) (or, more specifically, the ratio between the distances, as measured in the direction of the vertical axis of rotation, between, at one hand, the engagement location and the radial rollers and, at the other hand, the engagement position(s) and the radial rollers) will be determined by the ratio between the radial loads acting at the engagement location and at the at least one engagement position. If, for example, apart from the radial load at the engagement location there is only a radial load at a single engagement position, and both radial loads are equally large, those distances should be similar.

An additional advantage of the assembly is, that the relative radial distortion (rotation and/or deformation) of the bearing rings is independently minimised for the vertical (axial) loads as well as for the horizontal (radial) loads. This means that one load component (vertical or horizontal) does not influence the other load component and thus load distributions with any ratio between the vertical and horizontal loads can be coped with. Further, the second bearing ring is supported in a rather flexible manner, allowing the bearing assembly to compensate for (production) misalignments, deformations of any of the concentric parts and any other distortions of the first bearing ring without causing large stresses. Finally, the assembly allows to reduce the amount of construction material (especially steel) needed for supporting the bearing.

In one embodiment a yoke is provided which at said engagement location is rigidly connected to the second bearing ring and which extends to the at least one engagement position and wherein the second concentric part indirectly engages the second bearing ring through said yoke at said at least one engagement position. In such an embodiment the second concentric part thus does not directly engage the second bearing ring.

In such an embodiment of the assembly it is possible that the load support member of the second concentric part is connected to the second bearing ring at the engagement location through a flange, wherein the yoke has a vertical leg which extends towards said engagement position and which is connected to said flange. Such a construction of the yoke is very simple but nevertheless very effective in achieving the desired result. The flange generally will be connected to the second bearing ring by bolts or similar means, offering a large area where loads can be transmitted between the second concentric part and the second bearing ring. The rigid connection of the yoke to the second bearing ring may be directly or indirectly (for example through the flange).

According to a further embodiment the vertical leg of the yoke does not directly engage said second bearing ring and is constructed as a stiff element. As a result limited deformations of the yoke due to, mainly, radial loads will not lead to undesired loads acting on the second bearing ring.

However, it also is possible that the vertical leg of the yoke engages the second bearing ring through an intermediate member. This may be advantageous because radial loads then are directly transmitted to the second bearing ring. For example, said intermediate member may be a resin, for example Chockfast® from ITW Polymers Coatings North America of Montgomeryville, Pa.

The yoke may comprises a number of separate yoke members circumferentially spaced as seen around the vertical axis of rotation (the spacing between the successive yoke members may differ and may even be so small that successive yoke members, although defining separate parts, contact each other). Alternatively the yoke is a single yoke extending all around the vertical axis of rotation.

In an alternative embodiment of the assembly, the second concentric part directly engages the second bearing ring at said at least one engagement position. In such an embodiment therefore no yoke is provided (or one could say that the second bearing ring itself acts as such).

In such an embodiment it is conceivable that said second concentric part at said at least one engagement position is bolted to the second bearing ring (for example bolted to the underside of the second bearing ring).

Also in these alternative embodiments the load support member of the second concentric part may be connected to the second bearing ring at the engagement location through a flange.

In one embodiment of the assembly the second bearing ring is the inner bearing ring.

It is noted, however, that a situation in which the second bearing ring is the outer bearing ring, is equivalent to such a situation.

In a preferred embodiment of the assembly said engagement location is at a level above the radial rollers and said engagement position is at a level below the radial rollers. This means that the second concentric part engages the top of the second bearing ring at the engagement location and that the yoke extends downwardly from the top of said second bearing ring. However, a situation in which said engagement location is at a level below the radial rollers and in which the yoke extends upwardly, is conceivable too and is fully equivalent.

In a practical embodiment of the assembly said first concentric part is a vessel having attached thereto the first bearing ring defining an outer bearing ring, wherein said vessel is provided with a moonpool and wherein said second concentric part is a turret which is positioned in said moonpool and which, indirectly (through a yoke and a flange) or directly, is connected to the second bearing ring defining an inner bearing ring.

The weight of the turret (and of any components attached thereto) is one of the main contributors to the axial (vertical) load acting on the bearing rings. Apart from this axial load also radial loads will be present, for example caused by mooring forces acting on a lower end of the turret through mooring lines or caused by horizontal acceleration forces acting on the heavy turret.

In such an embodiment it is conceivable that the turret comprises an outer vertically extending hull defining the load support member and engaging the inner bearing ring through the flange at the engagement location, wherein the turret further comprises a horizontal plate extending in a radial plane and engaging the yoke at the at least one engagement position, which horizontal plate is capable of introducing there radial loads but is not capable of introducing there axial loads.

It is possible that the turret is provided with at least one axially and radially extending plate, bulkhead or similar part defining a load transfer member, for transferring axial loads to the vertically extending hull, which plate, bulkhead or similar part does not indirectly (for example through a flange or yoke) or directly engage the second bearing ring and outer part of the horizontal plate. As a result all or most of the axial loads (for example the weight of the turret and external axial forces acting on the turret) in the turret are transferred to the hull without being transferred to the horizontal plate, yoke or flange.

More specifically the turret may comprise a number of plates, bulkheads or similar parts circumferentially spaced as seen around the vertical axis of rotation.

One possible option to achieve that the horizontal plate is not capable of introducing there axial loads, is that the horizontal plate is weak in the axial direction of the assembly (thus can bend upwards or downwards). But the hull too may be weak against radial distortion (thus can bend inwards and outwards), as a result of which any misalignment or rotations forced by the outer bearing ring can easily be followed by the inner bearing ring. It even might be possible that the horizontal plate allows some radial displacement although it primarily is constructed to introduce radial loads.

BRIEF DESCRIPTION OF THE DRAWINGS

Hereinafter aspects of the invention will be elucidated while referring to the drawing. Herein.

DETAILED DESCRIPTION OF THE ILLUSTRATIVE EMBODIMENTS

Figure 2:
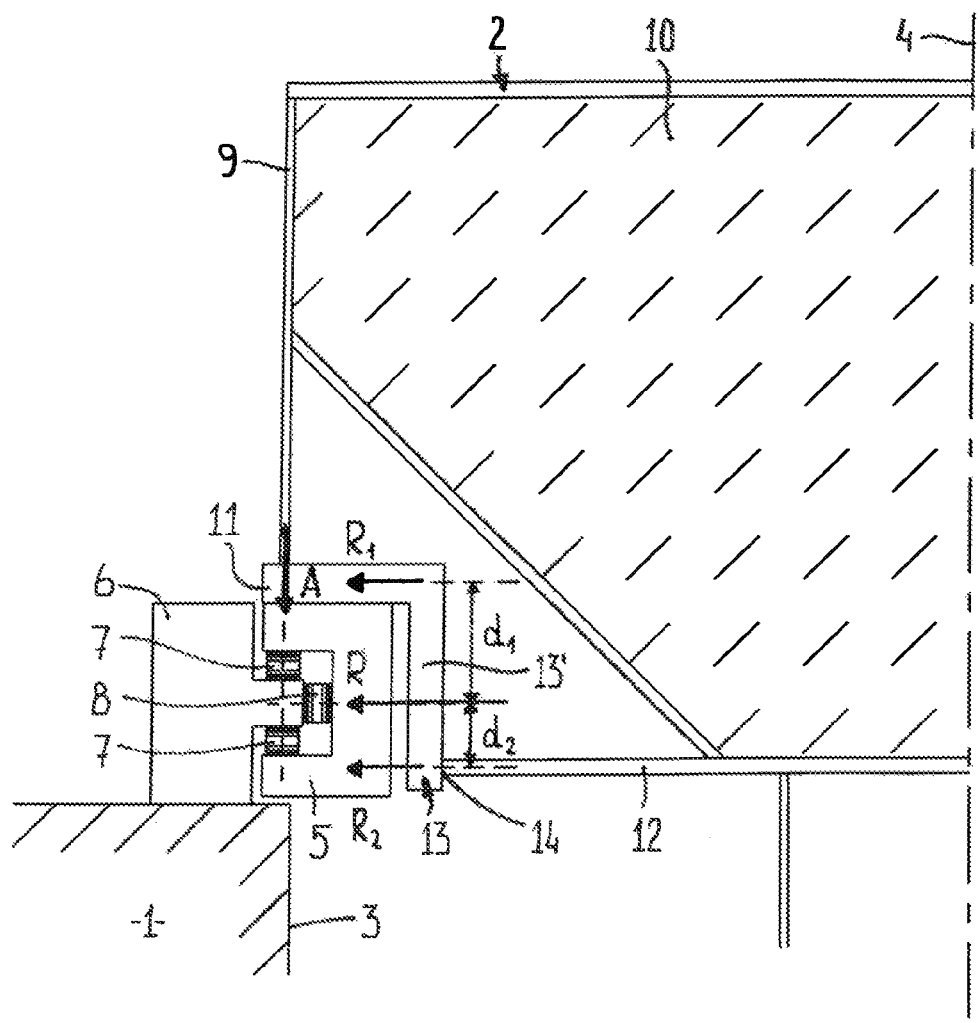
FIG. 2 in a similar view shows a first embodiment of an assembly herein described.
Figure 3:
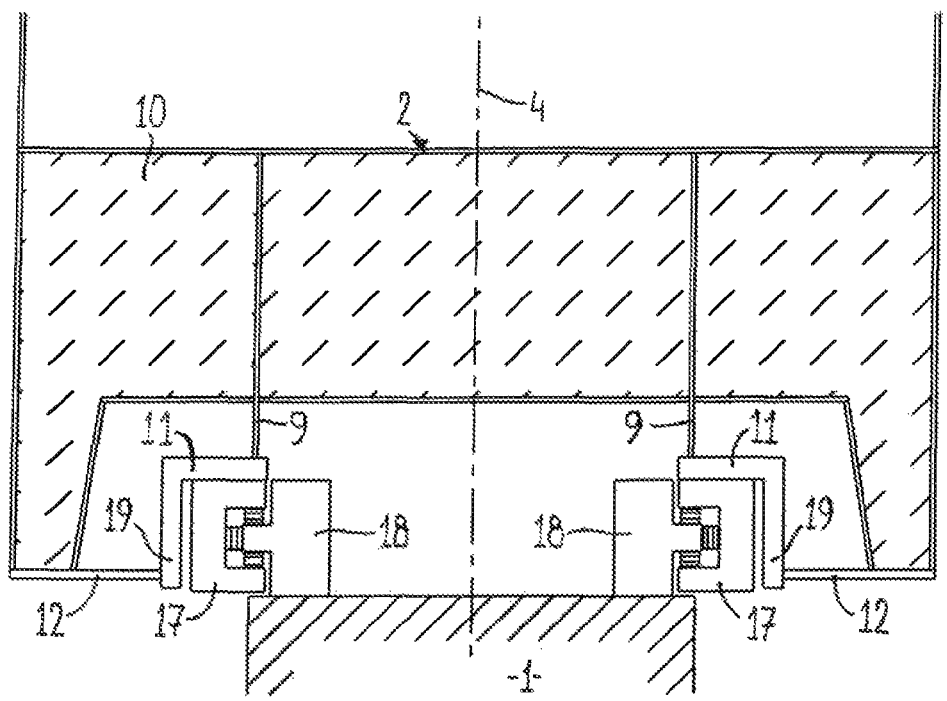
FIG. 3 shows a second embodiment.
Figure 4:
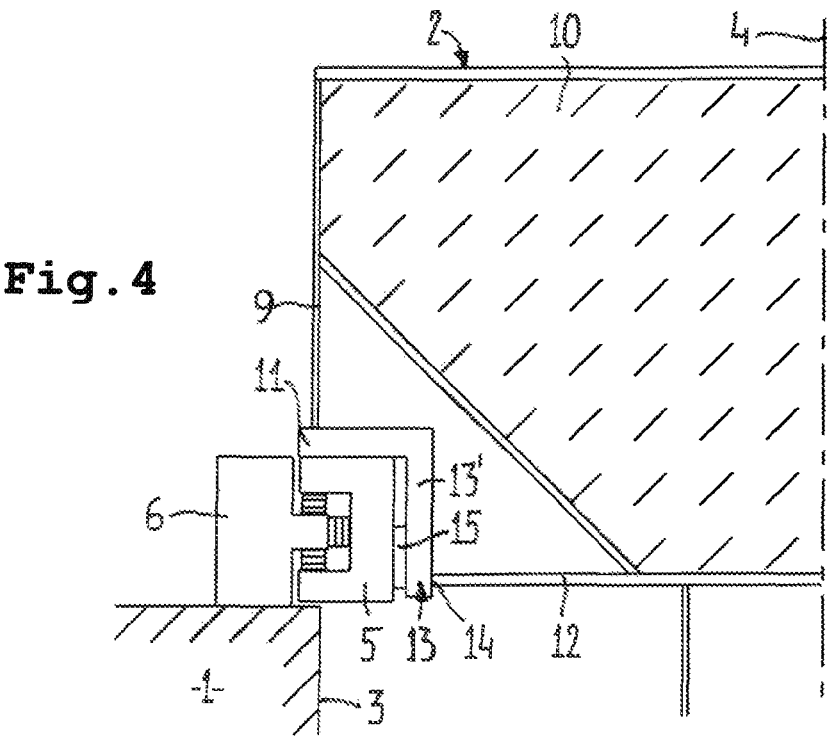
FIG. 4 shows a third embodiment.
Figure 5:
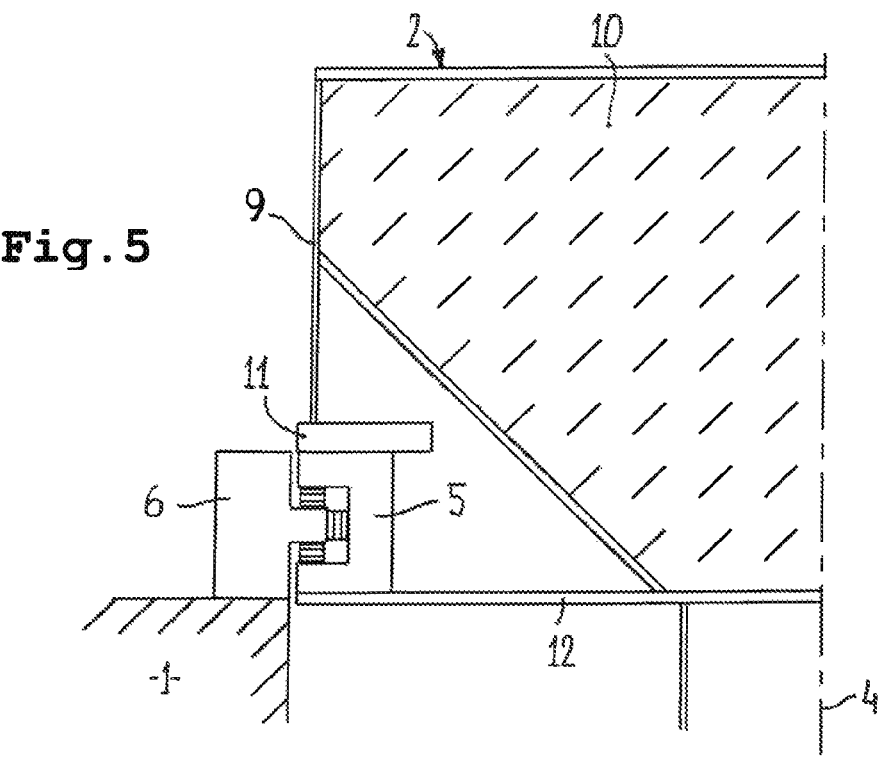
FIG. 5 shows a fourth embodiment.
Figure 6:
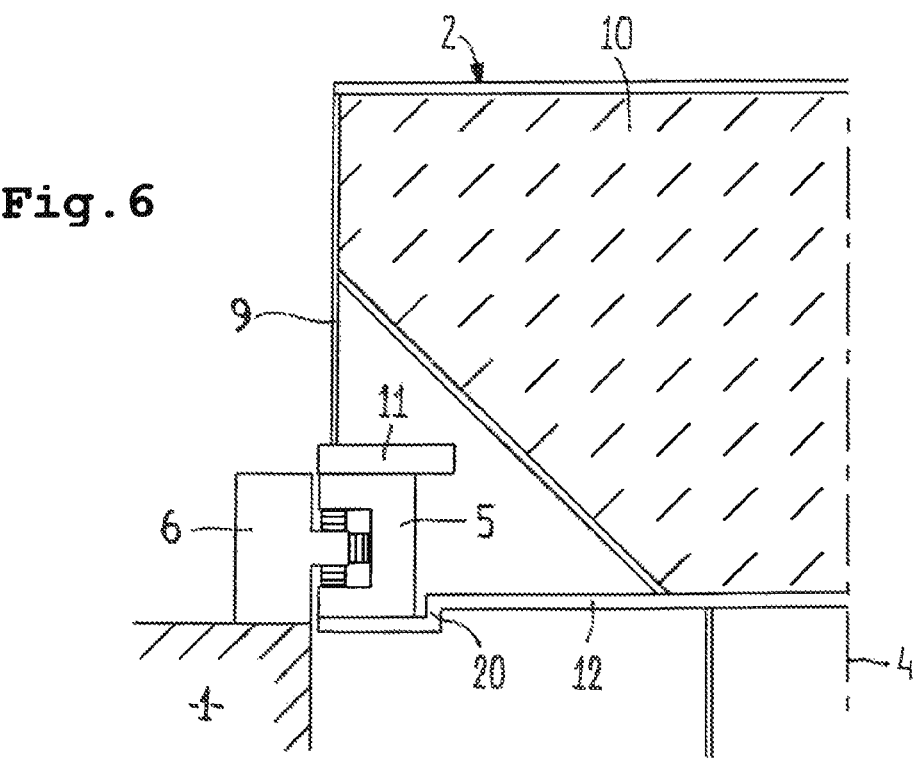
FIG. 6 shows a fifth embodiment.

Before in detail describing the figures, it is noted that the embodiments according to FIGS. 2-4 have in common that a second bearing ring is indirectly engaged by a concentric part through a yoke; FIGS. 5 and 6 have in common that a second bearing ring is directly engaged by a concentric part without using a yoke.

Figure 1:
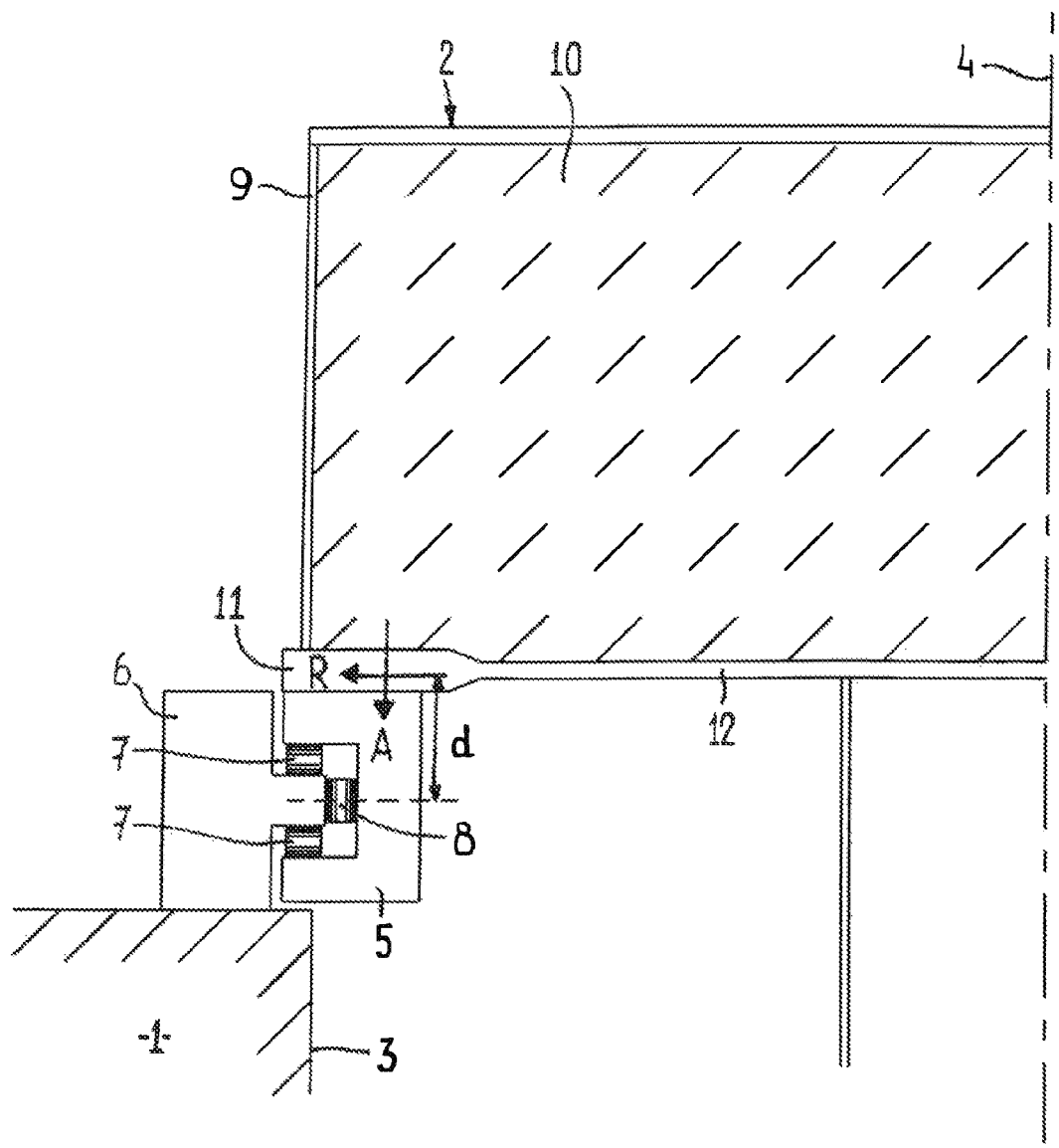
FIG. 1 in a schematic cross sectional view shows one half of a state of the art assembly.

Firstly referring to FIG. 1, one half of a state of the art assembly is shown. This assembly comprises two concentric parts 1 and 2 (which in the present case represent a vessel 1 and a turret 2 positioned in a moonpool 3 of the vessel 1) and a bearing between said parts 1,2 for allowing a relative rotation between said parts around a vertical axis of rotation 4 (generally, this axis of rotation 4 in this representation also defines an axis of symmetry for the assembly and the part right of it which is not illustrated, is a mirror image of the illustrated left part).

The bearing comprises an inner bearing ring 5, an outer bearing ring 6, axial rollers 7 (for example balls or cylinders) for transmitting, between the inner bearing ring 5 and the outer bearing ring 6, axial loads (indicated by arrow A) in parallel to the vertical axis of rotation 4 and radial rollers 8 for transmitting, between the inner and outer bearing rings, radial loads (indicated by arrow R) in a direction towards or away from the vertical axis of rotation 4.

The outer bearing ring 6 is attached to the concentric part (for example deck of the vessel) 1 in a manner for maximally limiting a radial distortion thereof (that means that the outer bearing ring 6 over its range of expected operational loads will not or hardly be distorted and will substantially maintain its position and shape).

The other concentric part (or turret) 2 is provided with an outer hull 9 which (for example due to the presence of axially extending plates or bulkheads 10 or another load transfer member) will lead substantially all axial (vertical) loads (arrow A) into the inner bearing ring 5 through a flange 11 which defines an engagement location. This flange 11 may be part of the turret 2 (and for example may be an integral part of a horizontal plate 12 being connected thereto or formed from a single unitary body) and may be bolted to the inner bearing ring 5. Generally, the (resultant of the) vertical load (arrow A) introduced into said inner bearing ring 5 by said concentric part 2 does not extend through the axial rollers 7. As a result, this axial (vertical) load A may introduce a moment leading to a distortion of the inner bearing ring 5.

Moreover, the radial loads (arrow R) are also introduced at the flange or engagement location 11 through the horizontal plate 12 (or equivalent structure) and because such radial loads act at a distance d above the radial rollers 8, this also causes a moment on the inner bearing ring 5 which may result in a radial distortion thereof.

Referring to FIG. 2, an assembly according to a first embodiment of the present invention is illustrated. This embodiment too relates to a turret 2 housed in a moonpool 3 of a vessel 1. This assembly partly is similar to the state of the art assembly according to FIG. 1 and similar parts are provided with similar references. Thus it comprises an inner bearing ring 5, outer bearing ring 6, axial rollers 7, radial rollers 8, a first concentric part (vessel) 1 and a second concentric part (turret) 2.

The turret 2 again comprises an outer hull 9 (also sometimes referred to in the art as "can section") which through flange 11 (defining the engagement location) loads the inner bearing ring 5 with axial load A. As will appear below, the axial load A now extends in line with (through) the axial rollers 7.

The assembly is provided with a yoke 13 (most times constructed as a stiff element) having vertical leg 13' connected to the flange 11. The vertical leg 13' extends to an engagement position 14 which with respect to the flange or engagement location 11 is located at the opposite side of the radial rollers 8, as seen in the direction of the vertical axis of rotation 4 (meaning here that the engagement position 14 is at a level below the radial rollers 8 (distance $d_2$) and the engagement location 11 is at a level above the radial rollers 8 (distance $d_1$)).

The turret 2 again comprises a horizontal plate 12, which however now engages the yoke 13 at said engagement position 14 in such a manner that substantially no axial loads are introduced there and such that the resultant R of the radial (horizontal) loads $R_2$ and $R_1$ introduced into said second bearing ring 5 at said engagement position 14 and at the engagement location 11, respectively, extends through the radial rollers 8.

It is noted that "introduced into said second bearing ring 5" means for radial load $R_1$ directly introduced through the flange 11, but means for the radial load $R_2$ indirectly introduced via the yoke 13 and flange 11.

The ratio between the distances $d_1$ and $d_2$ will depend from the ratio between the radial loads $R_1$ and $R_2$. For example, when both loads are equal, the distances will be similar too for achieving that the resultant radial load R extends through the radial rollers 8. Different loads will lead to different distances.

For assuring that no vertical (axial) load is introduced at the engagement location 14 but only such that the (resultant) load A is in line with the axial rollers 7, the horizontal plate 12 is weak and can deflect easily in the vertical (axial) direction. Further the radial plates or bulkheads 10 do not engage the horizontal plates 12 (or an outer part thereof), nor the yoke 13 nor the flange 11 and thus no vertical loads are transmitted there.

Further, the hull 9 may be weak in a radial direction, such that the inner bearing ring 5 can follow imposed radial distortions of the outer bearing ring 6 without damaging the axial and radial rollers 7,8. In certain embodiments it may be conceivable that the horizontal plate 12 also in a very limited extent is weak in a radial direction.

Further it is clearly visible in FIG. 2 that the vertical leg 13' of the yoke 13 does not engage the inner bearing ring 5. The yoke 13, for transferring the radial load $R_2$, is constructed as a stiff element.

FIG. 4 shows an alternative embodiment in which an intermediate member 15 is provided extending between the yoke 13 and the inner bearing ring 5. Thus, (part of the) radial forces also may be transmitted directly from the horizontal plate 12 to the inner bearing ring 5. The intermediate member 15 may be made of a resin, such as Chockfast®. As an alternative the vertical leg 13' of the yoke 13 also may directly engage the inner bearing ring 5.

FIG. 3 illustrates one example of many possible alternative embodiments of the assembly, for example for use in an embodiment in which the concentric part 2 is part of a crane. Whereas in the embodiment of FIGS. 2 and 4 the yoke 13 is attached to the inner bearing ring 5 (and the outer bearing ring 6 is rigidly fixed to a structure such as a vessel 1 as to be substantially without distortion when loaded), in FIG. 3 a yoke 19 is attached to an outer bearing ring 17 (and an inner bearing ring 18 is rigidly fixed to a stationary part 1, such as a lower frame for a crane or a vessel).

Figure 7:
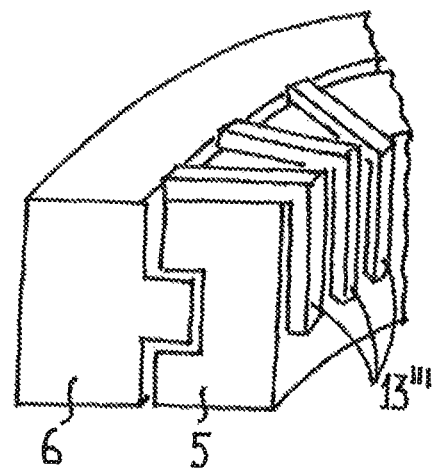
FIG. 7 is a schematic, perspective view of a portion of an embodiment of a bearing assembly.
Figure 8:
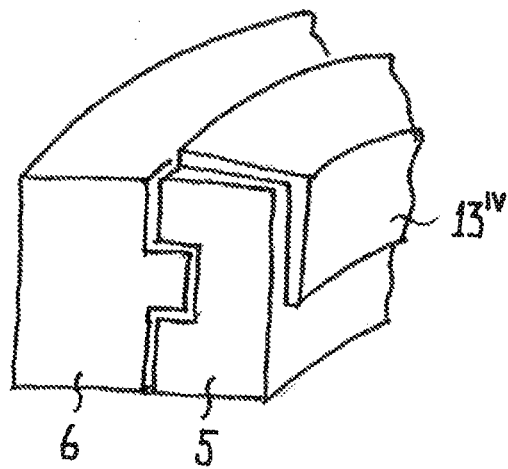
FIG. 8 is a schematic, perspective view of a portion of another embodiment of a bearing assembly.

The yoke 13 (or 19) may comprise a number of separate yoke members $13^{iii}$ circumferentially spaced as seen around the vertical axis of rotation 4, as represented for example in FIG. 7 (in which case, for example, in FIG. 3 the yoke parts 19 shown right and left are separate parts not connected to each other), but it is also possible that the yoke $13^{iv}$ is a single yoke extending all around the vertical axis of rotation, as illustrated for example in FIG. 8. Likewise the horizontal plate 12 may be divided into a number of adjacent plate members or even rods extending radially. Finally, the radial plates 10 may be replaced by other structures (for example a structure of reinforcing rods) equally fit for transmitting forces towards the outer hull 9.

FIG. 5 shows an embodiment in which the horizontal plate 12 (and thus the second concentric part 2) directly engages the second bearing ring 5 (while defining the engagement position). In this embodiment no yoke is provided (although one also could say that the inner bearing ring 5 acts as such). The horizontal plate 12 may be attached to the inner bearing ring 5 in different manners, for example using bolts.

The embodiment illustrated in FIG. 6 much resembles that of FIG. 5, but now the horizontal plate 12 comprises a step 20 which one also could consider as (part of) a yoke which together with the inner bearing ring 5 is responsible for introducing the horizontal (radial) loads at the desired position (level). As a result of said step it is possible to position the horizontal plate 12 at a higher level compared to the situation according to FIG. 5 (as may be required to correctly balance the radial loads) while still being able to attach the horizontal plate 12 to the lower side of the second bearing ring 5 (as may be advantageous for constructional reasons).

The invention is not limited to the embodiments described before which may be varied widely within the scope of the invention as defined by the appending claims. For example, embodiments are conceivable in which the construction is upside down compared to the embodiments described before. Further, although the embodiments shown and described before all refer to situations in which a horizontal load is introduced at two locations (at the engagement location and at the engagement position), it is also conceivable that horizontal loads are introduced at more than two locations (specifically by providing more than one engagement positions, such that, as seen for example in FIG. 2, the radial force $R_2$ is divided in two or more radial forces acting at different levels). The same applies for the axial load which may be applied at more than one engagement location, for example additionally at the lower side of the second bearing ring.

What is claimed is:

1. An assembly comprising:
    two concentric parts including a first concentric part and a second concentric part, the second concentric part having a load support member and a load transfer member,
    a bearing between said concentric parts for allowing a relative rotation between said concentric parts around a vertical axis of rotation, said bearing comprising:
        bearing rings including a first bearing ring and a second bearing ring, the first bearing ring being of size to be concentric with the second bearing ring,
        axial rollers configured to transmit, between the first and second bearing rings, axial loads in parallel to the vertical axis of rotation and
        radial rollers configured to transmit, between the first and second bearing rings, radial loads in a direction towards or away from the vertical axis of rotation,
    wherein the first bearing ring is attached to the first concentric part in a manner to maximally limit a radial distortion thereof and
    wherein the second concentric part is connected to the second bearing ring at an engagement location, wherein the load support member at the engagement location is connected to the second bearing ring such that the axial load introduced into said second bearing ring by said load support member extends through the axial rollers, wherein the load transfer member is configured to transfer axial loads therein to said load support member and wherein the second concentric part indirectly or directly engages the second bearing ring at at least one engagement position in such a manner that only radial loads and substantially no axial loads are introduced at said at least one engagement position and wherein said at least one engagement position with respect to the engagement location is located such, as seen in the direction of the vertical axis of rotation, that the resultant of radial loads introduced into said second bearing ring at said at least one engagement position and at the engagement location extends through the radial rollers without causing a moment around said radial rollers.

2. The assembly according to claim 1, and further comprising a yoke rigidly connected to the second bearing ring at said engagement location and which extends to the at least one engagement position and wherein the second concentric part indirectly engages the second bearing ring through said yoke at said at least one engagement position.

3. The assembly according to claim 2, wherein the load support member of the second concentric part is connected to the second bearing ring at the engagement location through a flange and wherein the yoke has a vertical leg which extends towards said at least one engagement position and which is connected to said flange.

4. The assembly according to claim 3, wherein the vertical leg of the yoke does not directly engage said second bearing ring and is constructed as a stiff element.

5. The assembly according to claim 3, wherein the vertical leg of the yoke engages the second bearing ring through an intermediate member.

6. The assembly according to claim 5, wherein said intermediate member is a resin.

7. The assembly according to claim 2, wherein the yoke comprises a number of separate yoke members circumferentially spaced as seen around the vertical axis of rotation.

8. The assembly according to claim 2, wherein the yoke is a single yoke extending all around the vertical axis of rotation.

9. The assembly according to claim 1, wherein the second concentric part directly engages the second bearing ring at said at least one engagement position.

10. The assembly according to claim 9, wherein said second concentric part at said at least one engagement position is bolted to the second bearing ring.

11. The assembly according to claim 9, wherein the load support member of the second concentric part is connected to the second bearing ring at the engagement location through a flange.

12. The assembly according to claim 1, wherein the second bearing ring is an inner bearing ring.

13. The assembly according to claim 1, wherein said engagement location is at a level above the radial rollers and said at least one engagement position is at a level below the radial rollers.

14. The assembly according to claim 1, wherein said first concentric part is a vessel having attached thereto the first bearing ring defining an outer bearing ring, wherein said vessel is provided with a moonpool and wherein said second concentric part is a turret which is positioned in said moonpool and which, indirectly or directly, is connected to the second bearing ring defining an inner bearing ring.

15. The assembly according to claim 14, wherein the turret comprises an outer vertically extending hull defining the load support member and engaging the inner bearing ring at the engagement location, wherein the turret further comprises a horizontal plate extending in a radial plane and indirectly or directly engaging the second bearing ring at the at least one engagement position, which horizontal plate is capable of introducing there radial loads but is not capable of introducing there axial loads.

16. The assembly according to claim 15, wherein the turret is provided with at least one axially and radially extending plate, bulkhead or similar part defining the load transfer member, for transferring axial loads to the vertically extending hull, which plate, bulkhead or similar part does not indirectly or directly engage the second bearing ring and outer part of the horizontal plate.

17. The assembly according to claim 16 and further comprising a yoke rigidly connected to the second bearing ring at said engagement location and which extends to the at least one engagement position and wherein the second concentric part indirectly engages the second one of bearing rings through said yoke at said at least one engagement position and wherein the load support member of the second concentric part is connected to the second bearing ring at the engagement location through a flange and wherein the plate, bulkhead or similar part does not engage said yoke and flange.

18. The assembly according to claim 16, comprising a number of plates, bulkheads or similar parts circumferentially spaced as seen around the vertical axis of rotation.

19. The assembly according to claim 15, wherein the horizontal plate is weak in the axial direction of the assembly.

20. The assembly according to claim 1, wherein said first concentric part is a stationary or movable chassis for a crane having attached thereto the first bearing ring that defines an outer bearing ring, wherein said crane is provided with a rotatable crane tower defining the second concentric part which, indirectly or directly, is connected to the second bearing ring that defines an inner bearing ring.

* * * * *